United States Patent
Kate et al.

(10) Patent No.: US 11,429,873 B2
(45) Date of Patent: Aug. 30, 2022

(54) SYSTEM FOR AUTOMATIC DEDUCTION AND USE OF PREDICTION MODEL STRUCTURE FOR A SEQUENTIAL PROCESS DATASET

(71) Applicant: International Business Machines Corporation, Armonk, NY (US)

(72) Inventors: Kiran A. Kate, Chappaqua, NY (US); Chandrasekhara K. Reddy, Kinnelon, NJ (US); Jayant R. Kalagnanam, Briarcliff Manor, NY (US); Zhiguo Li, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 16/354,883

(22) Filed: Mar. 15, 2019

(65) Prior Publication Data
US 2020/0293910 A1    Sep. 17, 2020

(51) Int. Cl.
*G06N 5/00*    (2006.01)
*G06N 5/02*    (2006.01)
(Continued)

(52) U.S. Cl.
CPC .......... *G06N 5/02* (2013.01); *G06F 16/2393* (2019.01); *G06F 16/9024* (2019.01)

(58) Field of Classification Search
None
See application file for complete search history.

(56) References Cited

U.S. PATENT DOCUMENTS 7,200,523 B1 *  4/2007  Yeh ..................... G05B 13/048
                                                    702/182
2011/0178622 A1  7/2011  Tuszynski
(Continued)

FOREIGN PATENT DOCUMENTS

WO  WO-2018075995 A1 *  4/2018  ............. G06N 20/00
WO  2018084867 A1  5/2018

OTHER PUBLICATIONS

A Time Series Data Management Framework, Matus-Castillejos et al. (Year: 2005).*
(Continued)

*Primary Examiner* — Augustine K. Obisesan
(74) *Attorney, Agent, or Firm* — Harrington & Smith

(57) ABSTRACT

A sub-process sequence is identified from a temporal dataset. Based on time information, predictors are categorized as being available or not available during time periods. The predictors are used to make predictions of quantities that will occur in a future time period. The predictors are grouped into groups of a sequence of sub-processes, each including a grouping of one or more of the predictors. Information is output that allows a human being to modify the groups. The groups are finalized, responsive to any modifications. Prediction models are extracted based on dependencies between groups and sub-processes. A final predication model is determined based on a prediction model from the prediction models that best meets criteria. A dependency graph is generated based on the final prediction model. Information is output to display the final dependency graph for use by a user to adjust or not adjust elements of the sequential process.

20 Claims, 8 Drawing Sheets

(51) Int. Cl.
    *G06F 16/23*     (2019.01)
    *G06F 16/901*    (2019.01)

(56) References Cited

U.S. PATENT DOCUMENTS

| | | | |
|---|---|---|---|
| 2015/0302432 A1* | 10/2015 | Chien | G06Q 30/0202 |
| | | | 705/7.31 |
| 2015/0371243 A1 | 12/2015 | Ramaswamy et al. | |
| 2017/0061297 A1* | 3/2017 | Joshi | G06N 5/04 |
| 2017/0243122 A1 | 8/2017 | Komatsu et al. | |
| 2017/0262781 A1* | 9/2017 | Yang | G06Q 10/06393 |
| 2020/0242483 A1* | 7/2020 | Shashikant Rao | G06N 5/022 |

OTHER PUBLICATIONS

Cheng H., Tan PN., Gao J., Scripps J., "Multistep-Ahead Time Series Prediction", in Ng WK., Kitsuregawa M., Li J., Chang K. (eds), Advances in Knowledge Discovery and Data Mining. PAKDD 2006, Lecture Notes in Computer Science, vol. 3918, Springer, Berlin, Heidelberg, [retrieved Dec. 7, 2018].

\* cited by examiner

SYSTEM FOR AUTOMATIC DEDUCTION AND USE OF PREDICTION MODEL STRUCTURE FOR A SEQUENTIAL PROCESS DATASET

BACKGROUND

This invention relates generally to processing sequential datasets and, more specifically, relates to a system for automatic deduction and use of prediction model structure for a sequential process dataset.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

There are a number of processes that can be classified as sequential processes. A sequential process is any physical process that has a series of steps. Each step in the process is associated with a set of measurements. Consider the following two examples:

1) A software development project is executed by splitting the work into multiple stages and there are some inherent dependencies between the stages. If the goal is to predict Key Performance Indicators (KPIs), such as a duration to complete a project, the cost incurred in completing the project and the like, the prediction problem can be split into multiple and sequential stages.

2) Any manufacturing process is a multi-stage, sequential process. For example, cement manufacturing. If the goal is to predict the final quality of cement given the raw observed and controlled variables, the prediction can be solved in multiple steps such as predicting the cement fineness at the grinding mill and then predicting the quality as output of the separators.

Based on the sequential property of these processes, some current systems try to predict what will happen at different times based on which stage is currently being performed. That is, prediction of final outcome of a sequential process is a multi-stage prediction problem, where outcome of the first stage is dependent on observed predictors, but the prediction of the subsequent steps can use the prediction made in previous steps as input. For example, in Cheng H., et al., "Multistep-Ahead Time Series Prediction", they state the following in the Abstract section:

"Multistep-ahead prediction is the task of predicting a sequence of values in a time series. A typical approach, known as multi-stage prediction, is to apply a predictive model step-by-step and use the predicted value of the current time step to determine its value in the next time step. This paper examines two alternative approaches known as independent value prediction and parameter prediction. The first approach builds a separate model for each prediction step using the values observed in the past. The second approach fits a parametric function to the time series and builds models to predict the parameters of the function. We perform a comparative study on the three approaches using multiple linear regression, recurrent neural networks, and a hybrid of hidden Markov model with multiple linear regression. The advantages and disadvantages of each approach are analyzed in terms of their error accumulation, smoothness of prediction, and learning difficulty."

See: Cheng H., Tan P N., Gao J., Scripps J., "Multistep-Ahead Time Series Prediction", in Ng W K., Kitsuregawa M., Li J., Chang K. (eds), Advances in Knowledge Discovery and Data Mining. PAKDD 2006, Lecture Notes in Computer Science, vol. 3918, Springer, Berlin, Heidelberg.

This Cheng et al. paper talks about the task of predicting a sequence of values in a time series. Cheng et al. describes an approach where they apply a predictive model step by step and use the predicted value of the current time step to determine its value in the next time step.

In particular, Cheng et al. talks about prediction of the same quantity at multiple time instants, where the temporal sequence is clear and straight forward. What this does not translate to is a system where a temporal sequence involving multiple variables, and the dependency of which is the result of the physical nature of the underlying sequential process, is not known. That is, the temporal sequence has not been discovered.

SUMMARY

This section is meant to be exemplary and not meant to be limiting.

A method is disclosed that includes identifying, by a computer system, a sub-process sequence from a temporal dataset, where the temporal dataset has a time dimension capturing data for a sequential process for a plurality of time periods. The method includes categorizing, based on the time information and by the computer system, predictors as being available or not available during the plurality of time periods. The predictors are used to make predictions of quantities that will occur in a future time period and predictors are features that are pieces of information about the sequential process. The method includes grouping by the computer system the predictors into groups of a sequence of sub-processes, each sub-process comprising a grouping of one or more of the predictors. The method further includes outputting information, by the computer system, that allows a human being to modify the groups by looking at one or more time-series plots representing the groups and corresponding predictors. The method also includes finalizing, by the computer system and responsive to any modifications made by the human being, the groups. The method includes extracting, by the computer system, a plurality of prediction models based on dependencies between the groups and corresponding sub-processes, and determining a final predication model based on a prediction model from the plurality of prediction models that best meets certain criteria. The method includes generating, by the computer system, a dependency graph based on the final prediction model, the dependency graph indicating a temporal order of the predictors and divided into a sub-process sequence. The method includes outputting information, by the computer system, to be used to display the final dependency graph for use by a user to adjust or not adjust elements of the sequential process.

Another exemplary embodiment is a computer system. The computer system comprises one or more memories having computer program code thereon, and one or more processors. The one or more processors, in response to retrieval and execution of the computer program code, cause the computer system to perform operations comprising: identifying, by the computer system, a sub-process sequence from a temporal dataset, where the temporal dataset has a time dimension capturing data for a sequential process for a plurality of time periods; categorizing, based on the time information and by the computer system, predictors as being available or not available during the plurality of time periods, wherein the predictors are used to make predictions of quantities that will occur in a future time period and predictors are features that are pieces of information about the sequential process; grouping by the computer system the predictors into groups of a sequence of sub-processes, each sub-process comprising a grouping of one or more of the predictors; outputting information, by the computer system, that allows a human being to modify the groups by looking at one or more time-series plots representing the groups and corresponding predictors; finalizing, by the computer system and responsive to any modifications made by the human being, the groups; extracting, by the computer system, a plurality of prediction models based on dependencies between the groups and corresponding sub-processes; determining a final predication model based on a prediction model from the plurality of prediction models that best meets certain criteria; generating, by the computer system, a dependency graph based on the final prediction model, the dependency graph indicating a temporal order of the predictors and divided into a sub-process sequence; and outputting information, by the computer system, to be used to display the final dependency graph for use by a user to adjust or not adjust elements of the sequential process.

An additional is a computer program product. The computer program product comprises a computer readable storage medium having program instructions embodied therewith. The program instructions executable by a computer system to cause the computer system to perform operations comprising: identifying, by the computer system, a sub-process sequence from a temporal dataset, where the temporal dataset has a time dimension capturing data for a sequential process for a plurality of time periods; categorizing, based on the time information and by the computer system, predictors as being available or not available during the plurality of time periods, wherein the predictors are used to make predictions of quantities that will occur in a future time period and predictors are features that are pieces of information about the sequential process; grouping by the computer system the predictors into groups of a sequence of sub-processes, each sub-process comprising a grouping of one or more of the predictors; outputting information, by the computer system, that allows a human being to modify the groups by looking at one or more time-series plots representing the groups and corresponding predictors; finalizing, by the computer system and responsive to any modifications made by the human being, the groups; extracting, by the computer system, a plurality of prediction models based on dependencies between the groups and corresponding sub-processes; determining a final predication model based on a prediction model from the plurality of prediction models that best meets certain criteria; generating, by the computer system, a dependency graph based on the final prediction model, the dependency graph indicating a temporal order of the predictors and divided into a sub-process sequence; and outputting information, by the computer system, to be used to display the final dependency graph for use by a user to adjust or not adjust elements of the sequential process.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The rest of this disclosure is divided into sections for ease of reference.

I. OVERVIEW AND EXEMPLARY SYSTEM

As described above, there are systems that describe prediction of the same quantity at multiple time instants, where the temporal sequence is clear and straight forward. What this does not translate to is a system where a temporal sequence involving multiple variables, and the dependency of which is the result of the physical nature of the underlying sequential process, is not known. That is, the temporal sequence has not been discovered.

A main challenge in a multi-stage setup of the prediction problem is identification of the stages, the dependencies between them, and the predictors to be used at each stage. We propose herein approaches to discover the multi-stage structure and use the discovered structure for a multi-stage prediction setting. Additional description of these approaches is presented after a system into which the exemplary embodiments may be used is described.

Figure 1:
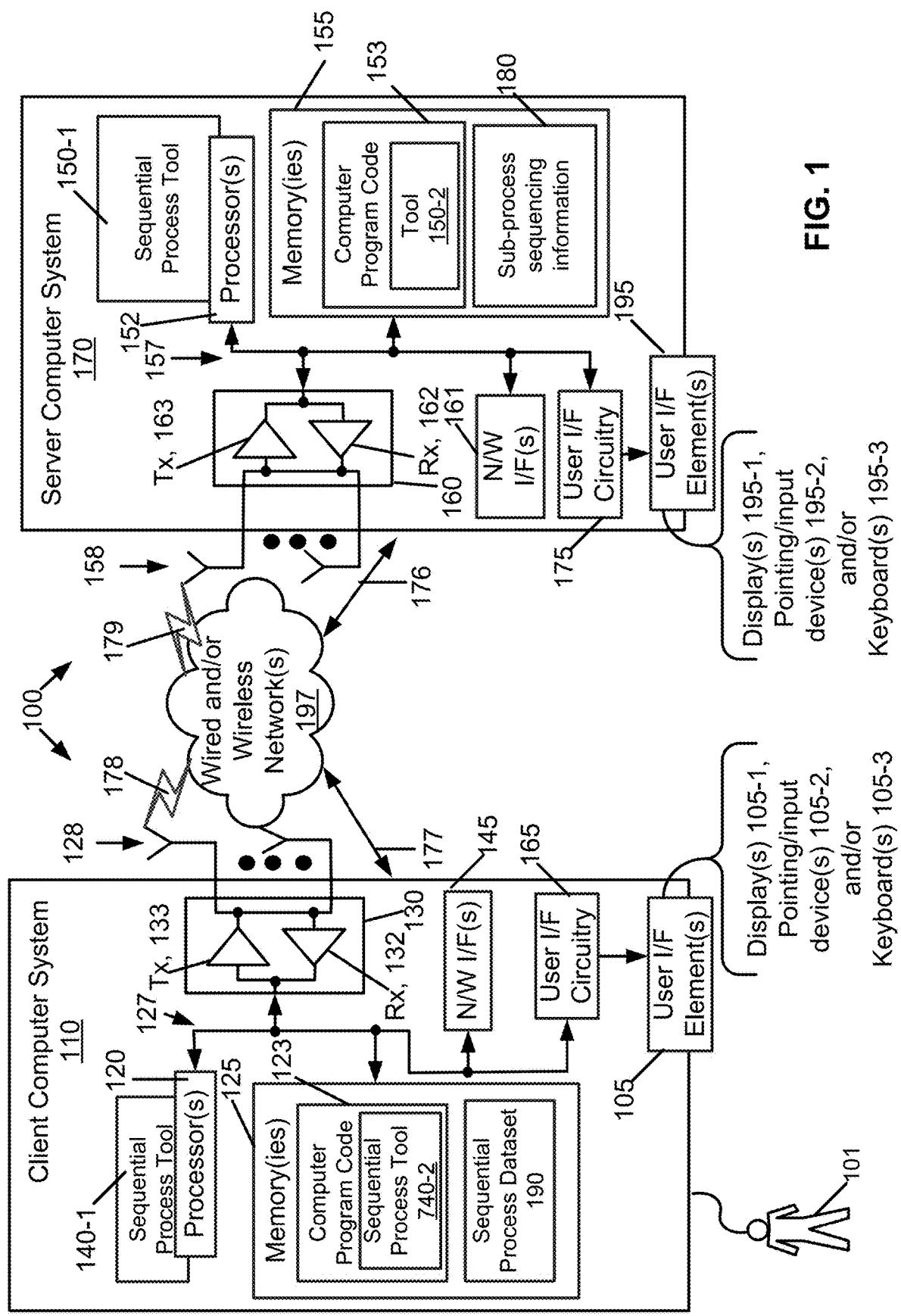
FIG. 1 is a block diagram of an exemplary and non-limiting system in which the exemplary embodiments may be implemented, in accordance with an exemplary embodiment.

Turning to FIG. 1, this figure shows a block diagram of one possible and non-limiting exemplary system 100 in which the exemplary embodiments may be practiced. In FIG. 1, a client computer system 110 is in wired and/or wireless communication with a service provider computer system 170. It is assumed the client computer system 110 is a client that accesses the service provider computer system 170, e.g., as a server. However, there does not need to be a client/server relationship between the client computer system 110 and the service provider computer system 770.

As an overview, the user 101 controls the client computer system 110 and uses a sequential process tool 140 to access the sequential process dataset 190. The sequential process dataset 190 may be for any sequential process, such as a software development project or manufacturing process. It is assumed that the sequential process dataset 190 has a time dimension, since this captures data for a sequential process. It is helpful to define terms that are used herein. A sequential dataset is from a same feature, measured at different times. Concerning a sequential process dataset 190, the process that generates the dataset is sequential in nature, but may or may not have the same feature at different times. For instance, for a first step, temperature might be important. In a second step, however, temperature might not be important. As an example, the first step could involve annealing a semiconductor, where the feature of temperature is important, and the second step could involve etching of the semiconductor, where temperature might not be important.

The client computer system 110, under control of the sequential process tool 140, sends the sequential process dataset 190 to the server computer system 170, in an exemplary embodiment. Other techniques are possible, such as the client computer system 110 (e.g., under control of the sequential process tool 140) allowing the server computer system 170 to access the sequential process dataset 190.

In an example, the server computer system 170, under control of the sequential process tool 150, processes the sequential process dataset 190 and performs automatic deduction and use of prediction model structure to determine sub-process sequencing information 180 through techniques described in more detail below. For instance, based on the time information in the sequential process dataset 190, predictors may be characterized as being available or not available during those time periods. The sequential process tool 150 groups these features based on the time periods they are available, and will apply additional techniques as described in more detail below to determine the sub-process sequencing information 180. The server computer system 170, under control of the sequential process tool 150, could send the sub-process sequencing information 180 to the sequential process tool 140 or could allow the user 101 to view and/or interact with the sub-process sequencing information 180 while keeping the sub-process sequencing information 180 on the server computer system 170.

It is noted that this example considers there two be two separate sequential process tools 140 and 150 on two separate computer systems, but this is not necessary. The sequential process tool 140 could be the only sequential process tool (e.g., and there would be no server computer system 170), or the sequential process tool 150 could be the only sequential process tool and the client computer system 110 would send (e.g., under direction of the user 101) the sequential process dataset 190 to the server computer system 170.

The client computer system 110 includes one or more processors 120, one or more memories 125, one or more wireless transceivers 130, one or more network (N/W) interfaces (I/F(s)) 145, and user interface circuitry 165, interconnected through one or more buses 127. Each of the one or more wireless transceivers 130 includes a receiver, Rx, 132 and a transmitter, Tx, 133. The one or more buses 127 may be address, data, and/or control buses, and may include any interconnection mechanism, such as a series of lines on a motherboard or integrated circuit, fiber optics or other optical communication equipment, and the like. The one or more wireless transceivers 130 are connected to one or more antennas 128. The one or more memories 125 include computer program code 123 and sequential process dataset 190.

The user computer system 110 includes a sequential process tool 140, comprising one of or both parts 740-1 and/or 740-2. The sequential process tool 140 causes the client computer system 110 to perform operations as described herein. The sequential process tool 140 may be implemented in a number of ways. The sequential process tool 140 may be implemented in hardware as sequential process tool 140-1, such as being implemented as part of the one or more processors 120. The sequential process tool 140-1 may be implemented also as an integrated circuit or through other hardware such as a programmable gate array. In another example, the sequential process tool 140 may be implemented as sequential process tool 140-2, which is implemented as computer program code 123 and is executed by the one or more processors 120. For instance, the one or more processors 120, in response to retrieval and execution of the stored sequential process tool 140-2 in computer program code 123, cause the client computer system 110 to perform one or more of the operations as described herein. It should also be noted that the devices shown in the client computer system 110 are not limiting and other, different, or fewer devices may be used.

The user interface circuitry 165 communicates with one or more user interface elements 105, which may be formed integral with the client computer system 110 or be outside the client computer system 110 but coupled to the client computer system 110. The user interface elements 105 include one or more of the following: one or more displays 105-1; one or more pointing/input devices 105-2; and/or one or more keyboards. This list is not exhaustive or limiting, and other, different, or fewer elements may be used 105-3. A user 101 (a human being in this example) interacts with the client computer system 110, e.g., to cause the system 110 to take certain actions such as causing the system 110 to perform automatic deduction and use of prediction model structure, without or in conjunction with the server computer system 170. These operations may also be caused by the client computer system 110, in combination with actions by the user 101 or without actions by the user 101. The client computer system 110 communicates with server computer system 170 via one or more wired or wireless networks 197, via wired links 177 and 178 and wireless links 178 and 179.

The server computer system 170 includes one or more processors 152, one or more memories 155, one or more network interfaces (N/W I/F(s)) 161, one or more wireless transceivers 160, and user interface circuitry 175, interconnected through one or more buses 157. Each of the one or more wireless transceivers 160 includes a receiver, Rx, 162 and a transmitter, Tx, 163. The one or more wireless transceivers 160 are connected to one or more antennas 158. The one or more memories 155 include computer program code 153 and sub-process sequencing information 180.

The server computer system 170 includes a sequential process tool 150. The homomorphic learning and inferencing module 770 comprises one of or both parts 150-1 and/or 150-2, which may be implemented in a number of ways. The sequential process tool 150 may be implemented in hardware as sequential process tool 150-1, such as being implemented as part of the one or more processors 152. The sequential process tool 150-1 may be implemented also as an integrated circuit or through other hardware such as a programmable gate array. In another example, the sequential process tool 150 may be implemented as sequential process tool 150-2, which is implemented as computer program code 153 and is executed by the one or more processors 152. For instance, the one or more processors 152, in response to retrieval from memory of the sequential process tool 150-2 and execution of the corresponding computer program code 153, cause the server computer system 170 to perform one or more of the operations as described herein. It should also be noted that the devices shown in the server computer system 170 are not limiting and other, different, or fewer devices may be used.

The one or more buses 157 may be address, data, and/or control buses, and may include any interconnection mechanism, such as a series of lines on a motherboard or integrated circuit, fiber optics or other optical communication equipment, wireless channels, and the like. The user interface circuitry 175 communicates with one or more user interface elements 195, which may be formed integral with the server computer system 170 or be outside the server computer system 170 but coupled to the server computer system 170. The user interface elements 795 include one or more of the following: one or more displays 195-1; one or more pointing/input devices 195-2; and/or one or more keyboards 195-3. This list is not exhaustive or limiting, and other, different, or fewer elements may be used. For instance, the server could be remotely operated and there might not be any user interface element 195.

Having thus introduced one suitable but non-limiting technical context for the practice of the exemplary embodiments of this invention, the exemplary embodiments will now be described with greater specificity.

II. EXEMPLARY PROCESS FLOWS

This section contains descriptions of possible exemplary process flows. Note that some of the terminology used herein is defined in reference to FIG. 3.

Figure 2:
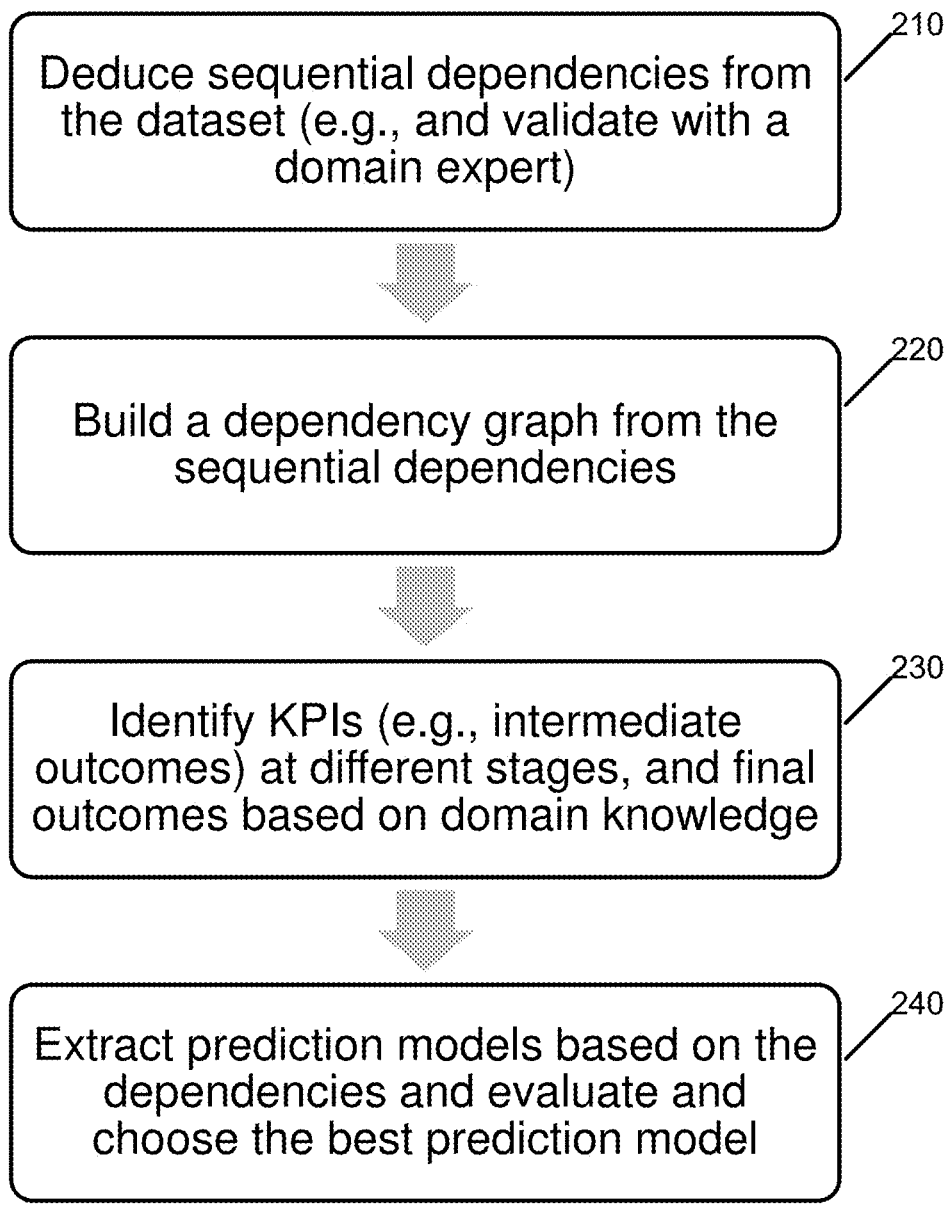
FIG. 2 is a block diagram of an exemplary method for automatic deduction and use of prediction model structure for a sequential process dataset, in accordance with an exemplary embodiment.

Turning to FIG. 2, this figure is a block diagram of an exemplary method for automatic deduction and use of prediction model structure for a sequential process dataset, in accordance with an exemplary embodiment. FIG. 2 also illustrates the operation of an exemplary method or methods, a result of execution of computer program instructions embodied on a computer readable memory, functions performed by logic implemented in hardware, and/or interconnected means for performing functions in accordance with exemplary embodiments. A brief introduction to the blocks in FIG. 2 is presented here and more detailed description for the blocks is presented below. The blocks in FIG. 2 are assumed to be performed by the server computer system 170, e.g., under control of the sequential process tool 150.

In block 210, the server computer system 170 deduces sequential dependencies from the sequential process dataset 190. This block may also include validating with a domain expert the deduced sequential dependencies. In block 220, the server computer system 170 builds a dependency graph from the sequential dependencies. The server computer system 170 in block 230 identifies key performance indicators (KPIs) (e.g., intermediate outcomes) at different stages, and identifies final outcomes based on domain knowledge. In block 240, the server computer system 170 extracts prediction models based on the dependencies and evaluates and chooses the best prediction model.

These blocks are explained in more detail in the following description.

II.1. Block 210

In block 210 of FIG. 2, the server computer system 170 deduces sequential dependencies from the sequential process dataset 190. This block may also include validating with a domain expert the deduced sequential dependencies. It is assumed that the sequential process dataset 190 has a time dimension since the dataset captures data for a sequential process. Based on the time information, we categorize predictors as being available or not available during those time periods. For example, for a software project, a value for man hours spent on coding might not be available during a design phase. Using such logic, we can identify features capturing details of different stages of the sequential process.

Figure 3:
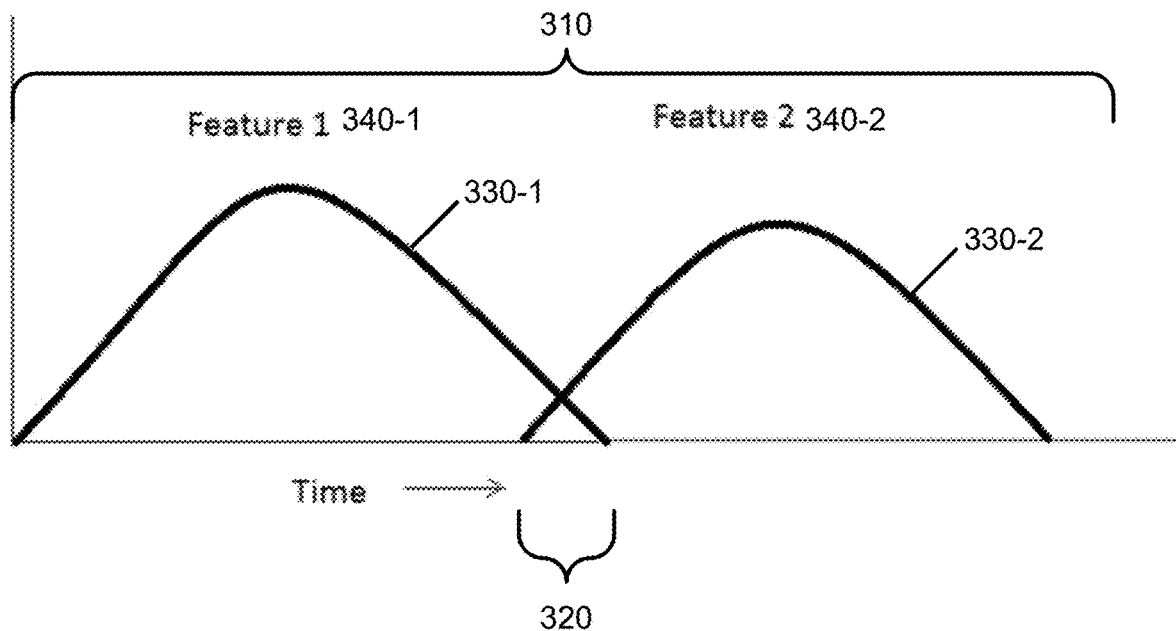
FIG. 3 is a diagram of Features 1 and 2 and their availability in a sequential process, in an exemplary embodiment.

For example, in the diagram of FIG. 3, this figure is a diagram of Features 1 and 2 and their availability in a representation of a sequential process 310, in an exemplary embodiment. Time is on the horizontal axis, and the vertical axis has no units. Feature 1 340-1 is represented by the sequential dataset 330-1, and Feature 2 340-2 is represented by the sequential dataset 330-2.

We can we see that Features 1 and 2 are available in the sequential process 310 almost at disjoint intervals of time, with a slight overlap in region 320. Based on a thresholding method, for instance, to detect the overlap, we can say that Feature 2 corresponds to a sub-process that is after (in temporal ordering) the sub-process for Feature 1 in the underlying sequential process 310.

A feature 340 is a piece of information about a sequential process 310, typically some measure of progress. For instance, a feature 340 could be lines of code, sensor data, and the like. The sequential element of the sequential process 310 involves step-wise execution that has a dependency on time. For instance, Step 2 (e.g., as represented by Feature 2 340-2) may be started if Step 1 (e.g., as represented by Feature 1 340-1) is completed by a certain amount such as 50 or 80 percent.

A predictor is related to a feature 340. In fact, a predictor is a feature 340 that exists in the sequential process dataset 190 and is used to predict any other quantity in the future. Any other quantity may be a KPI, which is a performance indicator related to the process. But in a general prediction setting, the quantity may be called a 'target', which is nothing but a specific feature which is felt to be dependent on the predictors. As an example for a predictor, in FIG. 3, one could say that a low value (say in the bottom quarter) from sequential dataset 330-1 of Feature 1 340-1 can predict that Feature 2 340-2 will be starting soon or has started, if the low value is after a peak value of the sequential dataset 330-1. While a predictor is a feature, not all features are predictors. For example, cost of steel is not a predictor for engineering man-hours.

II.2. Block 220

In block 220 of FIG. 2, the server computer system 170 builds a dependency graph from the variable dependencies. The information captured in block 210 can be represented as a graph, where the nodes are the features (e.g., and may be predictors) and edges capture the temporal ordering between the features.

Figure 4:
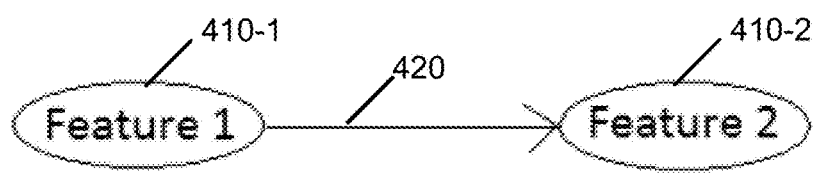
FIG. 4 is an example of the diagram of FIG. 3 illustrated as nodes connected by edges.

Taking the example from block 210, we can draw an edge between Features 1 and 2, as illustrated in FIG. 4. FIG. 4 is an example of the diagram of FIG. 3 illustrated as nodes connected by edges. In particular, node 410-1 corresponds to Feature 1 and node 410-2 corresponds to Feature 2, and the temporal ordering from earlier-in-time Feature 1 and its corresponding node 410-1 to later-in-time Feature 2 and its corresponding node 410-2 is indicated by the edge 420 originating at node 410-1 and ending at node 410-2.

II.3. Block 230

The server computer system 170 in block 230 of FIG. 2 identifies key performance indicators (KPIs) (e.g., intermediate outcomes) at different stages, and identifies final outcomes based on domain knowledge. In this block, actions are taken to identify the KPIs at different stages, and the final outcomes based on the domain knowledge. The KPIs are intermediate outcomes that occur during the sequential process. The KPIs are the key performance indicators and there exists a cascading effect of the influential factors at different process stages on the final outcomes. For instance, the quality of output at a Step 1 is likely to affect a Step 2, and Step 2 influences a Step 3, and so on. If something goes wrong in Step 1 (such as the quality of output being low), this can cascade forward. This block can also entail enumerating all possible cause-and-effect relationships between the stages based on the dependency graph built in block 220. This is described in more detail, e.g., in reference to FIG. 7, described below. Note that cause-and-effect relationships are also referred to as causal relationships herein. It is also noted that a KPI is the same as a performance indicator. The prefix 'key' just means that this indicator has been deemed to be an important performance indicator and hence we are trying to build a prediction model for the KPI.

II.4. Block 240

In block 240 of FIG. 2, the server computer system 170 extracts prediction models based on the dependencies and evaluates and chooses the best prediction model. This block entails extracting prediction models (e.g., comprising predictors at appropriate point in the sequential process and relationships between the predictors) from the graph. The block also entails evaluating and choosing the best model and the corresponding prediction structure. This is described in more detail, e.g., in reference to FIG. 7, described below. One important step here is that we treat this as a stage-by-stage prediction, and the dependencies between the stages (e.g., sub-processes) are very important in identifying a best model.

III. AN EXAMPLE OF A SEQUENTIAL PREDICTION MODEL STRUCTURE

Figure 5:
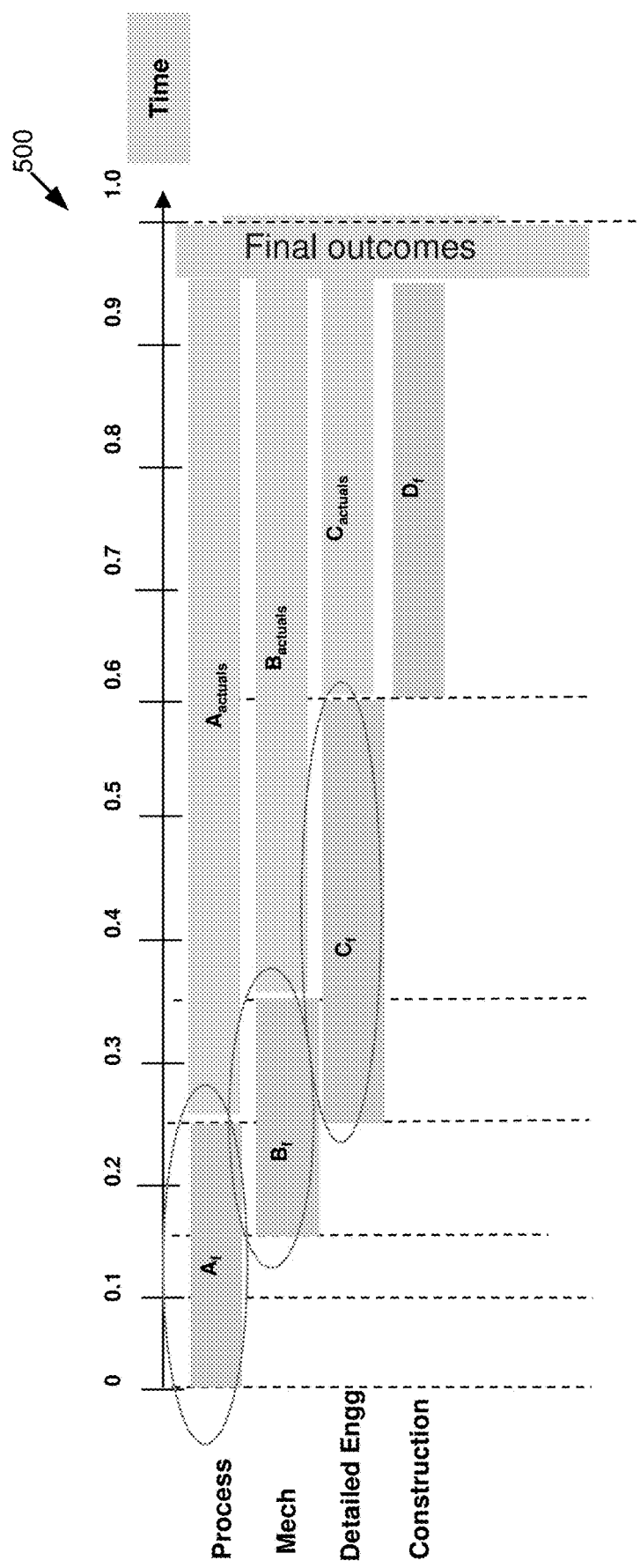
FIG. 5 illustrates an example of an example of the sequential prediction model structure, in accordance with an exemplary embodiment.

FIG. 5 illustrates an example of an example of a sequential prediction model structure 500. FIG. 5 shows a time range from zero (0) to one (1.0), where zero indicates start and 1.0 indicates end. This is an example of multi-stage project forecasting. There are four stages in this example of a construction project: process ("Process"); mechanical ("Mech"); detailed engineering ("Detailed Engg"); and construction ("Construction"), and these stages are defined by one or more domain experts (that is, experts in the construction industry for this example). The dependencies of features can be identified at each stage of the project. The variables $A_f$, $B_f$, $C_f$, and $D_f$ and $A_{actuals}$, $B_{actuals}$, and $C_{actuals}$ are process-related variables that are typically provided in a list by a user. That is, a user generally defines what makes up these variables. It is also possible to determine via computer analysis the steps. There is also a group of final outcomes. The KPIs (e.g., the intermediate outcomes) at each stage can be identified and associated with the project final outcomes through cause-effect relationships. The structure of a sequential prediction model 500 can be defined based on the dependency structure among the features at different stages and the cascading effects of the intermediate outcomes on the final outcomes.

IV. FURTHER EXAMPLES

This section contains additional examples.

IV.1. Example 1

Figure 6:
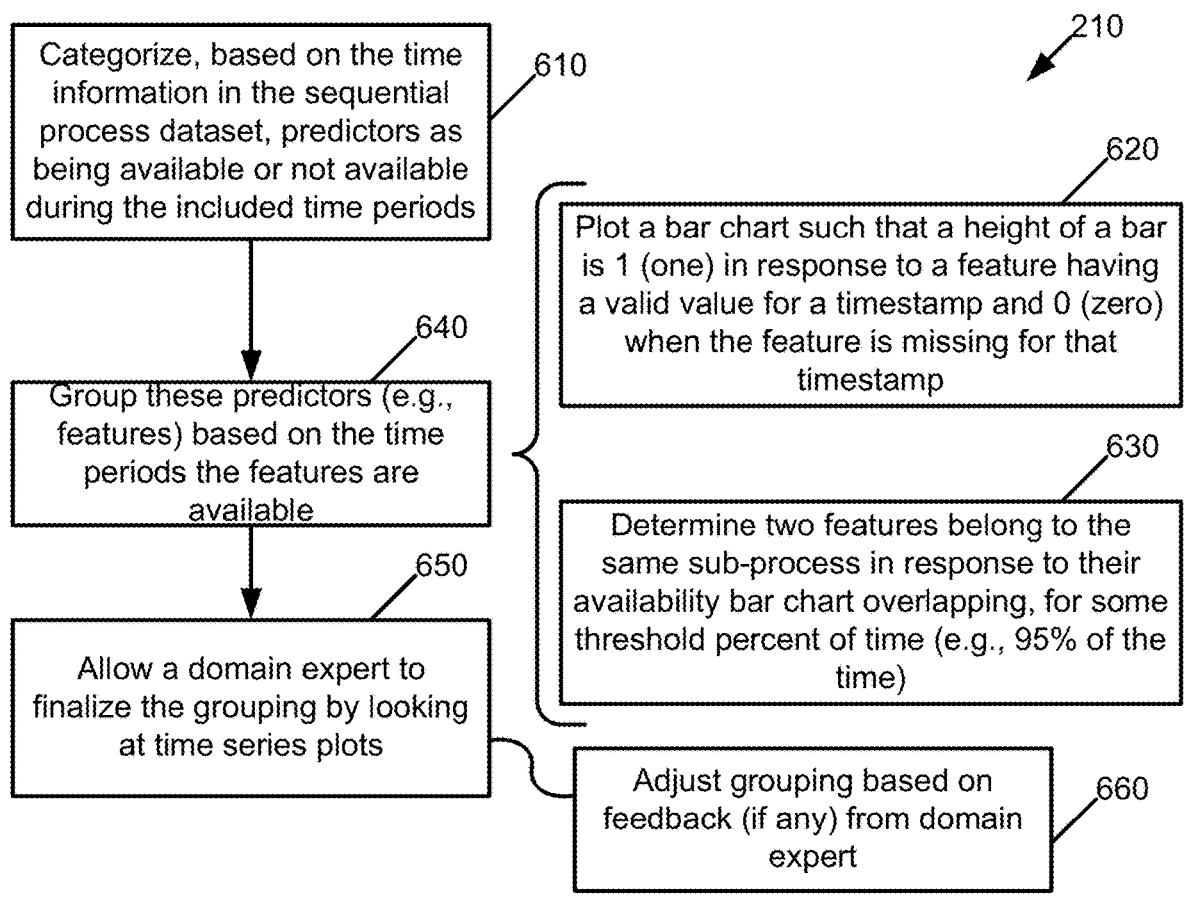
FIG. 6 is a logic flow diagram of one example of deducing sequential dependencies from the sequential process dataset, in accordance with an exemplary embodiment.

This section provides a brief synopsis and an additional example. A data-driven tool to identify the sub-process sequence from a temporal dataset has been described, e.g., as the sequential process tool 150. Referring to FIG. 6, this figure is a logic flow diagram of one example of deducing sequential dependencies from the sequential process dataset. FIG. 6 further illustrates the operation of an exemplary method or methods, a result of execution of computer program instructions embodied on a computer readable memory, functions performed by logic implemented in hardware, and/or interconnected means for performing functions in accordance with exemplary embodiments. FIG. 6 is one example of how block 210 of FIG. 2 might be performed. As recited above, block 210 has the server computer system 170 deducing sequential dependencies from the sequential process dataset 190. The blocks in FIG. 6 are assumed to be performed by the server computer system 170 under control of the sequential process tool 150.

As described above, based on the time information in the sequential process dataset 190, we categorize predictors as being available or not available during the included time periods. See block 610 of FIG. 6, where the sequential process tool 150 performs this categorization. As described above, a predictor is a feature 340 that exists in the sequential process dataset 190. Tool 150 in block 640 groups these predictors based on the time periods the features are available.

The grouping may be performed in several ways. One way we propose is as follows and is illustrated by blocks 620 and 630. The sequential process tool 150 in block 620 plots (e.g., on a display 105-1 and/or display 195-1) a bar chart such that the height of the bar is 1 (one) in response to a feature having a valid value for a timestamp and 0 (zero) when the feature is missing for that timestamp. The sequential process tool 150 in block 630 determines that two features belong to the same sub-process in response to their availability bar chart overlapping, for some threshold percent of time. For instance, the threshold percent of time could be 95% (95 percent) of the time. The 95% threshold is a parameter that can be tuned.

It is noted that in block 650 the sequential process tool 150 may also allow a domain expert to finalize the grouping by looking at the time series plots (e.g., shown on a display 105-1/195-1). In response to feedback (if there is any) from the domain expert, in block 660, the sequential process tool 150 adjusts the grouping.

IV.2. Example 2

Figure 7:
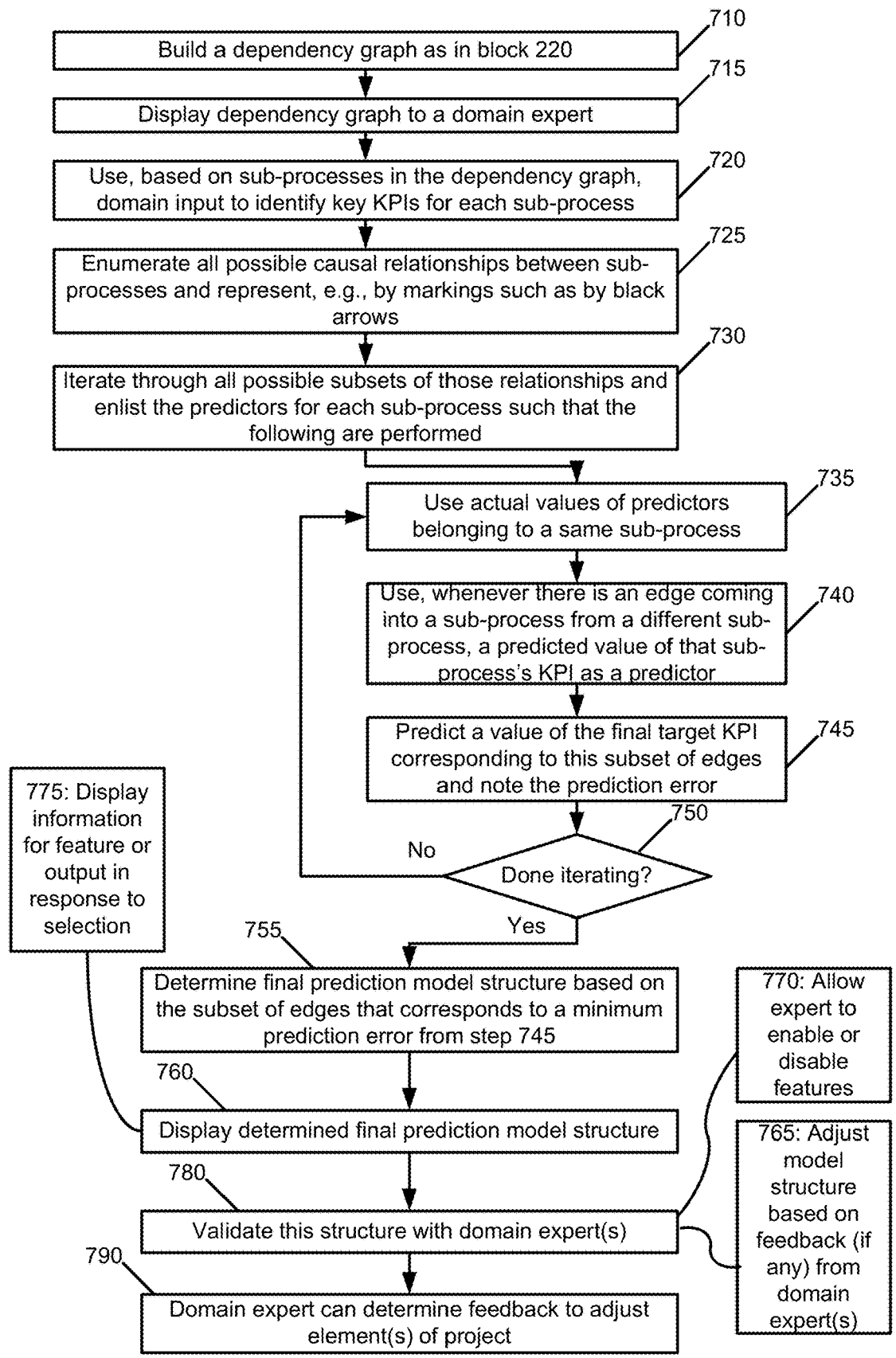
FIG. 7 is a logic flow diagram of one example of multi-stage prediction model structure identification, in accordance with an exemplary embodiment.

This example concerns multi-stage prediction model structure identification. This is described in reference to FIG. 7, is a logic flow diagram of one example of multi-stage prediction model structure identification, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The blocks in this figure are assumed to be performed by the server computer system 170 under control of the sequential process tool 150. This is also described in conjunction with FIGS. 8A and 8B, described below.

Figure 8A:
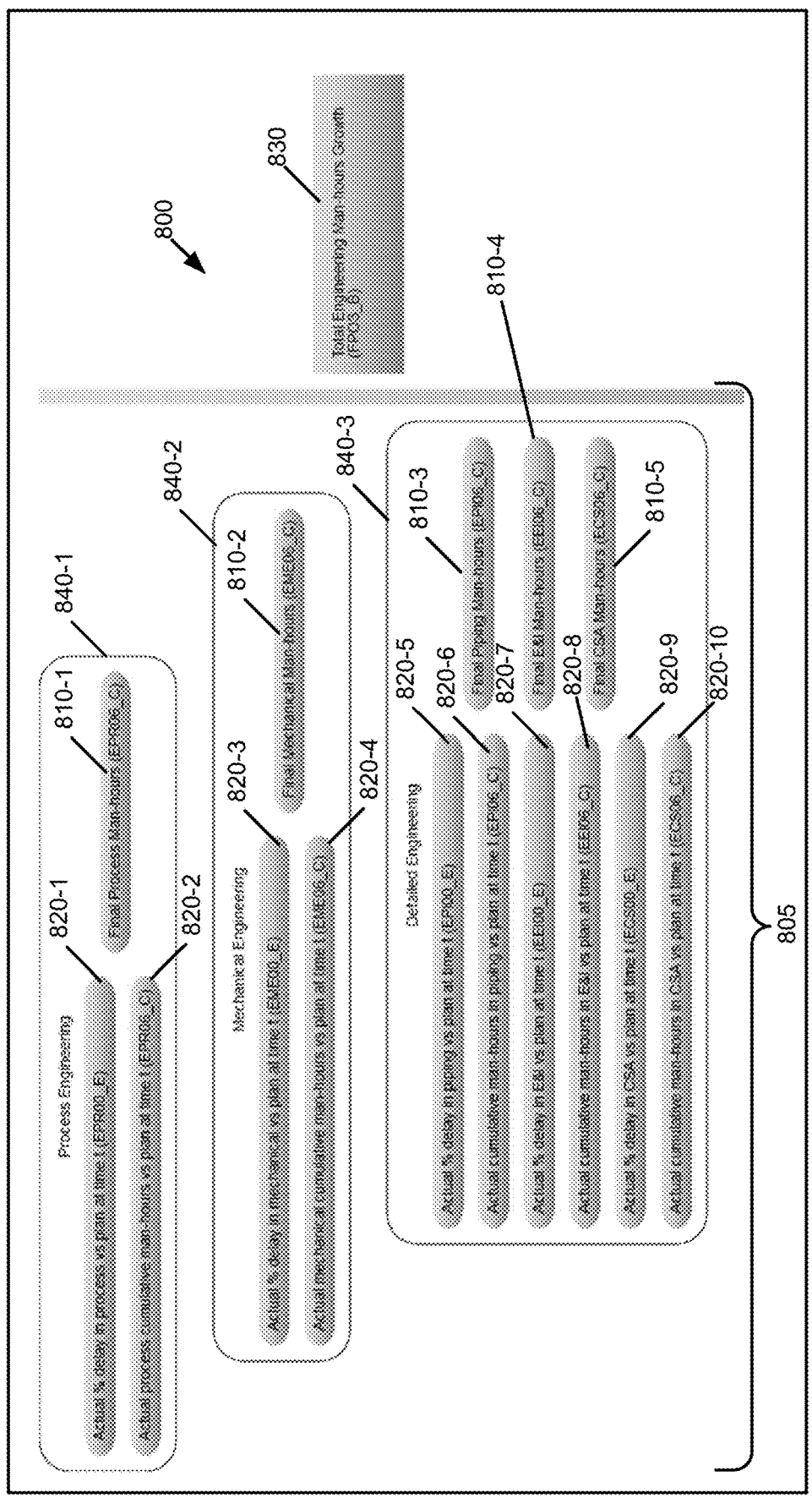
FIG. 8A is an exemplary visualization of a generated dependency graph, in accordance with an exemplary embodiment.
Figure 8B:
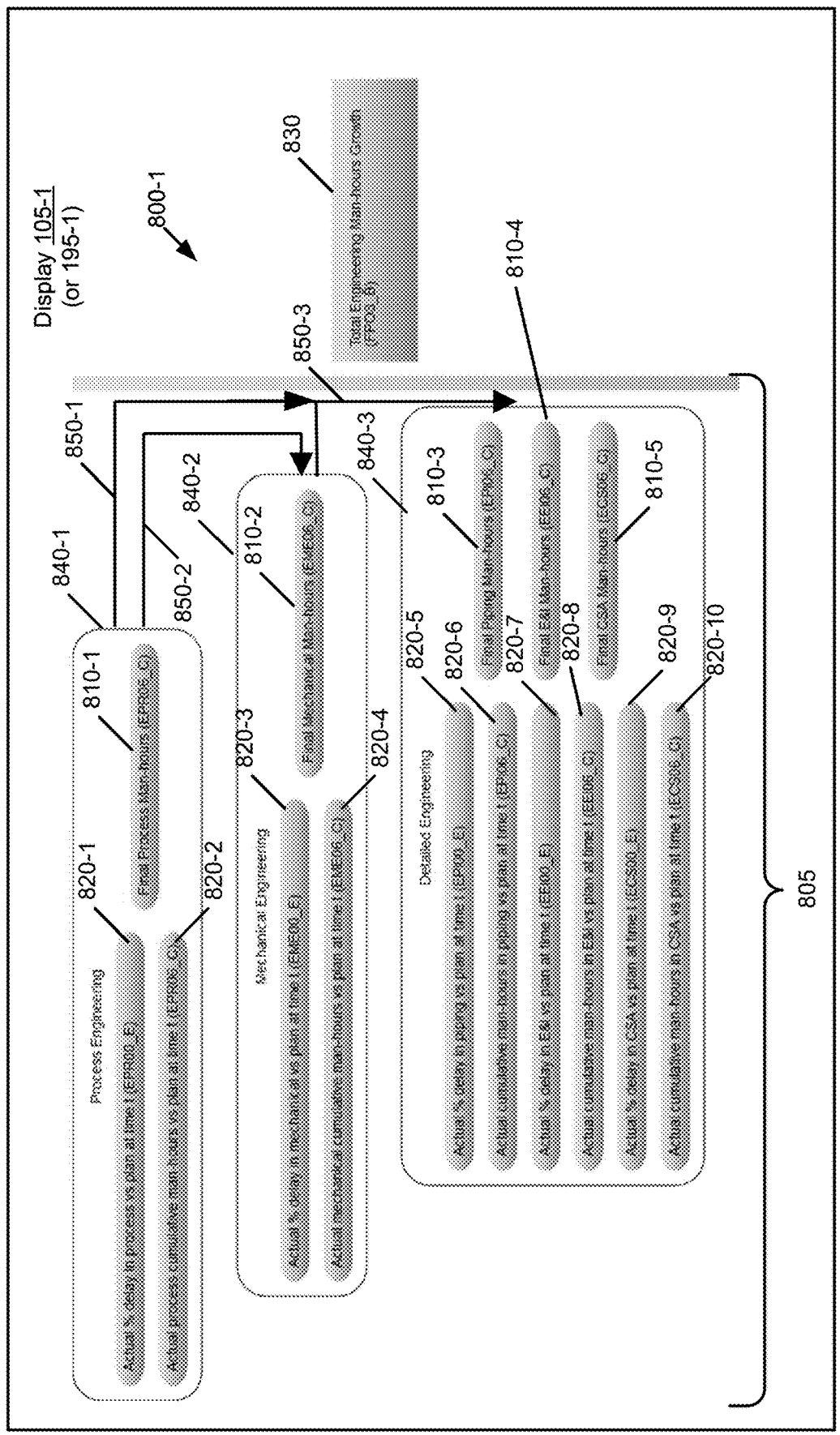
FIG. 8B is the exemplary visualization of a generated dependency graph of FIG. 8A after all possible causal relationships between sub-processes are assumed as shown by black arrows.

From the above description, we describe generating a dependency graph (see, e.g., block 220 of FIG. 2) with each feature as a node and a directed edge from a node to another if the second node follows the first as per the temporal ordering of the sub-processes (and their corresponding features) that have been identified. This is repeated as block 710 in FIG. 7. The tool 150 lets a domain expert (e.g., a user 101) visualize such a graph as illustrated in FIG. 8B. That is, FIG. 8B represents a dependency graph that is illustrated to a user (e.g., a domain expert). A user may be a domain expert, but that is not a requirement. FIG. 8A, meanwhile, represents a dependency graph that is used to illustrate the operation of some of the blocks of FIG. 7 and is typically not shown to a user. The edges are not explicitly shown in the visualization of FIG. 8A to avoid clutter, but the placement of the stages 840 from left to right indicates such relationships. That is, because the Process Engineering stage 840-1 starts to the left of Mechanical Engineering stage 840-2 in the display 105-1, this indicates stage 840-1 starts in time before stage 840-2. Similarly, because the Mechanical Engineering stage 840-2 starts to the left of the Detailed Engineering stage 840-3 in the display 105-1, this indicates stage 840-2 starts in time before stage 840-3. This illustration 800 of a dependency graph is shown on a display 105-1, at the client computer system 110. This could alternatively or also be shown on a display 195-1, at the server computer system 170, depending on implementation.

In the diagram of FIG. 8A, there are three stages illustrated: a Process Engineering stage 840-1; a Mechanical Engineering stage 840-2; and a Detailed Engineering stage 840-3 for an entire process 805. These are used to create a prediction output 830, the Total Engineering Man-hours Growth. In this example, each stage 840 is also a sub-process for the process 805. The following buttons are illustrated: buttons 810-1, 820-1, and 820-2 associated with the Process Engineering stage 840-1; buttons 810-2, 820-3, and 820-4 associated with the Mechanical Engineering stage 840-2; buttons 810-3, 810-4, 810-5, and 820-5 through 820-10 for the Detailed Engineering stage 840-3. The identified KPIs are placed on the right of each sub-process rectangle representing a stage 840 and are in buttons 810. The stages 840 will also be referred to as sub-processes 840. In this exemplary embodiment, each button 810 and 820 can be clicked on, which will show additional information (if there is any) about the feature associated with the button. Additionally, the user can enable or disable a corresponding feature by clicking on the associated button 820. For instance, the feature of "Actual % delay in process vs plan at time t" (e.g., "Actual percentage delay in process versus plan at time t"), can be enabled or disabled by a user by clicking on the button 820-1 (e.g., and perhaps selecting a menu to enable or disable the feature). The enabling by a user means in an exemplary embodiment the features are treated as predictors. By contrast, if a feature is disabled, it is not treated as a predictor. All features in the buttons 820 are initially enabled, in an exemplary embodiment. The parentheticals such as "(EPR00_E)" contain a label to help correlate the corresponding feature with other information, such as a list of features supplied by a user.

Based on the sub-processes 840, we may use domain input (e.g., already provided) to identify key KPIs for each sub-process in the dependency graph. In block 710, the computer system 170 displays a dependency graph to a domain expert, such as by outputting information suitable for display to the domain expert (a human being). After this, see, e.g., block 720 of FIG. 7, which is an example of block 230 of FIG. 2 (where the server computer system 170 identifies KPIs at different stages, and identifies final outcomes based on domain knowledge). The domain input may be from a domain expert (i.e., a human being with knowledge in a certain area). For instance, for concrete production, the domain expert could be a supervisor of a concrete production facility. The domain input may also be from generally available information about the domain if there is no access to a domain expert.

The KPIs are assumed to affect one or more sub-processes, but the causal relationship(s) is (or are) not apparent. We propose, in an exemplary embodiment, a data driven deduction of such relationships and propose extraction of a (e.g., best) prediction structure as follows. These blocks in FIG. 7 include one version of block 240 of FIG. 2, where the server computer system 170 extracts prediction models based on the dependencies and evaluates and chooses the best prediction model.

All possible causal relationships (e.g., cause-and-effect relationships) between sub-processes are enumerated and represented (see block 725 of FIG. 7) as shown by black arrows 850 in FIG. 8B, which is the exemplary visualization 800-1 of a generated dependency graph of FIG. 8A after all possible causal relationships between sub-processes have been enumerated as shown by black arrows 850. FIG. 8B is illustrated as a user interface on a display 105-1 (or 195-1). Other markings may be used, and the use of arrows is merely exemplary. In this example, the Process Engineering sub-process 840-1 has output via an arrow 850-2 connected to input of the Mechanical Engineering sub-process 840-2 and output via an arrow 850-1 connected to input of the Detailed Engineering sub-process 840-3, and the Mechanical Engineering sub-process 840-2 has output via an arrow 850-3 connected to input of the Detailed Engineering sub-process 840-3. The arrows 850 in this example show all possible causal relationships. We then iterate (see block 730 of FIG. 7, using the sequential process tool 150) through all possible subsets of those relationships (members of a power set) and enlist the predictors for each sub-process such that the following are performed:

1) The actual values of predictors belonging to the same sub-process are used, which occurs in block 735;

2) Whenever we have an edge coming into a sub-process from a different sub-process, we use the predicted value of that sub-process's KPI as a predictor, which occurs in block 740;

3) We predict the value of the final target KPI corresponding to this subset of edges and note the prediction error for this subset, which occurs in block 745.

As is known, a power set is a set of all the subsets of a set. If a set has N members, then the power set will have $2^N$ members. If the flow is not done iterating in block 750, that is the last possible subset has not been iterated through, the flow proceeds to block 735. If the flow is done iterating in block 750, that is the last possible subset has been iterated through, the flow proceeds to block 755.

The subset of edges that corresponds to minimum prediction error from the step above governs the final prediction model structure (e.g., a dependency graph) and it is visualized and validated with domain experts. That is, in block 755, the sequential process tool 150 determines a final prediction model structure based on the subset of edges that corresponds to a minimum prediction error from step 745. In block 760, the sequential process tool 150 displays (e.g., on display 105-1 or 195-1) the determined final prediction model structure as the exemplary visualization 800-1 of a generated dependency graph. This example assumes all arrows 850-1 through 850-3 are relevant, although this is for this simple example and not meant to be limiting. This displaying can include displaying information for a feature or an output in response to selection of either or both of these. See block 775. For instance, if a user selects the prediction output 830, information such as prediction information, data plots, and any other information associated with the prediction output 830 may be shown. Any other buttons 810, 820 may also be selected by a user and have corresponding information displayed.

In block 780, the sequential process tool 150 validates this structure with domain expert(s). This may include in block 770 the sequential process tool 150 allows the expert to enable or disable features. The sequential process tool 150, in response to input from the domain expert(s), in block 765 adjusts the model structure based on feedback (if any) from domain expert(s). That is, if there is no feedback, there would be no adjustment.

In block 790, the domain expert can determine feedback to adjust element(s) of project. For instance, the exemplary visualization 800-1 of a generated dependency graph in FIG. 8B has been determined based on, e.g., discovery of sequential processes (and sub-processes), and also on cause-and-effect relationships. This might allow a domain expert (e.g., a user), based on the prediction output 830 of the Total Engineering Man-hours Growth, to determine the project has been underestimated. Perhaps the project is more complex and therefore too long compared to initial projections. The user can determine what to do in response to this.

One exemplary situation is as follows. The flow of FIG. 7 may be performed, e.g., every two months for two years, and each prediction output 830 of the Total Engineering Man-hours Growth (or other prediction outputs 830) would be what is predicted it would look like at that point. There could be cost over/undershoots, time over/undershoots, and the like. It could be determined by the user whether the project is healthy based on the prediction output(s) 830, and the user can determine the following. Does the project need more people? Should the user be negotiating cash or other loan instruments? Should the user decide not to do anything or to perform corrective action(s)?

For instance, assume there is an engineering and construction company that uses a sequential process and that needs to take that into account predictions on final outcomes. The exemplary embodiments herein would be useful for this. Consider another example where predictive modelling based on the exemplary embodiments herein are used for a cement manufacturing company, as the process is sequential in nature. This sequential nature into account while creating the structure of the prediction model as described above.

There are many manufacturing processes which comprise sub-processes and the intermediate outcomes from the sub-processes influence the final outcomes. Creating a prediction model structure in a data-driven manner is of high value in such prediction problems.

The users for these processes can used the prediction outputs of the models created by the techniques described above to adjust (or not adjust) elements of the processes. The users can also get a sense of how the processes are developing and running at any point in time, and predictions of how they might develop and run in the future.

V. ADDITIONAL COMMENTS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   identifying, by a computer system, a sub-process sequence from a temporal dataset, where the temporal dataset has a time dimension capturing data for a sequential process for a plurality of time periods;
   categorizing, based on the time information and by the computer system, predictors as being available or not available during the plurality of time periods, wherein the predictors are used to make predictions of quantities that will occur in a future time period and predictors are features that are pieces of information about the sequential process;
   grouping by the computer system the predictors into groups of a sequence of sub-processes, each sub-process comprising a grouping of one or more of the predictors;
   outputting information, by the computer system, that allows a human being to modify the groups by looking at one or more time-series plots representing the groups and corresponding predictors;
   finalizing, by the computer system and responsive to any modifications made by the human being, the groups;
   extracting, by the computer system, a plurality of prediction models based on dependencies between the groups and corresponding sub-processes;
   determining a final predication model based on a prediction model from the plurality of prediction models that best meets certain criteria;
   generating, by the computer system, a dependency graph based on the final prediction model, the dependency graph indicating a temporal order of the predictors and divided into a sub-process sequence; and
   outputting information, by the computer system, to be used to display the final dependency graph for use by a user to adjust or not adjust elements of the sequential process.

2. The method of claim 1, wherein grouping the predictors into groups comprises plotting a bar chart wherein a height of the bar is a first height in response to a feature having a valid value for a timestamp and is a second, different height in response to a feature being missing for that timestamp, wherein two features belong to a same sub-process if their bar chart overlaps a certain percentage of times.

3. The method of claim 1, wherein the dependency graph comprises nodes and edges and the nodes are the features and the edges capture temporal ordering between the features.

4. The method of claim 3, wherein generating the dependency graph further comprises generating the dependency graph with each predictor as a node and a directed edge from a node to another node in response to the second node following the first node as per the temporal order of sub-processes corresponding to the first and second nodes.

5. The method of claim 4, wherein extracting the plurality of prediction models further comprises using, based on the sub-processes, domain input from a human being to identify key performance indicators for each sub-process, wherein the key performance indicators are assumed to affect one or more sub-processes.

6. The method of claim 5, wherein:
   extracting a plurality of prediction models further comprises determining causal relationships between sub-processes to determine a prediction model as follows:
   enumerating all possible causal relationships between sub-processes;
   iterating through all possible subsets of the causal relationships and enlisting the predictors for each sub-process such that actual values of predictors belonging to a same sub-process are used, such that whenever there is an edge coming into a sub-process from a different sub-process, a predicted value of that sub-process's key performance indicator is used as a predictor, and such that a value of a final target key performance indictor corresponding to this subset of edges is predicted and a prediction error for the final target key performance indictor is noted; and determining the final predication model further comprises setting the final prediction model as a subset of edges that corresponds to minimum prediction error for the corresponding key performance indicators.

7. The method of claim 6, further comprising outputting information, by the computer system, to be used to display the final dependency graph for use by a human being, allowing the human being to make one or more modifications to the final dependency graph, and adjusting, by the computer system and responsive to any modifications made by the human being, the final dependency graph responsive to modification by the human being.

8. A computer system comprising:
one or more memories having computer program code thereon; and
one or more processors, wherein the one or more processors, in response to retrieval and execution of the computer program code, cause the computer system to perform operations comprising:
identifying, by the computer system, a sub-process sequence from a temporal dataset, where the temporal dataset has a time dimension capturing data for a sequential process for a plurality of time periods;
categorizing, based on the time information and by the computer system, predictors as being available or not available during the plurality of time periods, wherein the predictors are used to make predictions of quantities that will occur in a future time period and predictors are features that are pieces of information about the sequential process;
grouping by the computer system the predictors into groups of a sequence of sub-processes, each sub-process comprising a grouping of one or more of the predictors;
outputting information, by the computer system, that allows a human being to modify the groups by looking at one or more time-series plots representing the groups and corresponding predictors;
finalizing, by the computer system and responsive to any modifications made by the human being, the groups;
extracting, by the computer system, a plurality of prediction models based on dependencies between the groups and corresponding sub-processes;
determining a final predication model based on a prediction model from the plurality of prediction models that best meets certain criteria;
generating, by the computer system, a dependency graph based on the final prediction model, the dependency graph indicating a temporal order of the predictors and divided into a sub-process sequence; and
outputting information, by the computer system, to be used to display the final dependency graph for use by a user to adjust or not adjust elements of the sequential process.

9. The computer system of claim 8, wherein grouping the predictors into groups comprises plotting a bar chart wherein a height of the bar is a first height in response to a feature having a valid value for a timestamp and is a second, different height in response to a feature being missing for that timestamp, wherein two features belong to a same sub-process if their bar chart overlaps a certain percentage of times.

10. The computer system of claim 8, wherein the dependency graph comprises nodes and edges and the nodes are the features and the edges capture temporal ordering between the features.

11. The computer system of claim 10, wherein generating the dependency graph further comprises generating the dependency graph with each predictor as a node and a directed edge from a node to another node in response to the second node following the first node as per the temporal order of sub-processes corresponding to the first and second nodes.

12. The computer system of claim 11, wherein extracting the plurality of prediction models further comprises using, based on the sub-processes, domain input from a human being to identify key performance indicators for each sub-process, wherein the key performance indicators are assumed to affect one or more sub-processes.

13. The computer system of claim 12, wherein:
extracting a plurality of prediction models further comprises determining causal relationships between sub-processes to determine a prediction model as follows:
enumerating all possible causal relationships between sub-processes;
iterating through all possible subsets of the causal relationships and enlisting the predictors for each sub-process such that actual values of predictors belonging to a same sub-process are used, such that whenever there is an edge coming into a sub-process from a different sub-process, a predicted value of that sub-process's key performance indicator is used as a predictor, and such that a value of a final target key performance indicator corresponding to this subset of edges is predicted and a prediction error for the final target key performance indictor is noted; and
determining the final predication model further comprises setting the final prediction model as a subset of edges that corresponds to minimum prediction error for the corresponding key performance indicators.

14. The computer system of claim 13, wherein the one or more processors, in response to retrieval and execution of the computer program code, cause the computer system to perform operations comprising: outputting information, by the computer system, to be used to display the final dependency graph for use by a human being, allowing the human being to make one or more modifications to the final dependency graph, and adjusting, by the computer system and responsive to any modifications made by the human being, the final dependency graph responsive to modification by the human being.

15. A computer program product comprising a computer readable storage medium having program instructions embodied therewith, the program instructions executable by a computer system to cause the computer system to perform operations comprising:
identifying, by the computer system, a sub-process sequence from a temporal dataset, where the temporal dataset has a time dimension capturing data for a sequential process for a plurality of time periods;
categorizing, based on the time information and by the computer system, predictors as being available or not available during the plurality of time periods, wherein the predictors are used to make predictions of quantities that will occur in a future time period and predictors are features that are pieces of information about the sequential process;

grouping by the computer system the predictors into groups of a sequence of sub-processes, each sub-process comprising a grouping of one or more of the predictors;

outputting information, by the computer system, that allows a human being to modify the groups by looking at one or more time-series plots representing the groups and corresponding predictors;

finalizing, by the computer system and responsive to any modifications made by the human being, the groups;

extracting, by the computer system, a plurality of prediction models based on dependencies between the groups and corresponding sub-processes;

determining a final predication model based on a prediction model from the plurality of prediction models that best meets certain criteria;

generating, by the computer system, a dependency graph based on the final prediction model, the dependency graph indicating a temporal order of the predictors and divided into a sub-process sequence; and outputting information, by the computer system, to be used to display the final dependency graph for use by a user to adjust or not adjust elements of the sequential process.

16. The computer program product of claim 15, wherein grouping the predictors into groups comprises plotting a bar chart wherein a height of the bar is a first height in response to a feature having a valid value for a timestamp and is a second, different height in response to a feature being missing for that timestamp, wherein two features belong to a same sub-process if their bar chart overlaps a certain percentage of times.

17. The computer program product of claim 15, wherein the dependency graph comprises nodes and edges and the nodes are the features and the edges capture temporal ordering between the features.

18. The computer program product of claim 17, wherein generating the dependency graph further comprises generating the dependency graph with each predictor as a node and a directed edge from a node to another node in response to the second node following the first node as per the temporal order of sub-processes corresponding to the first and second nodes, and wherein extracting the plurality of prediction models further comprises using, based on the sub-processes, domain input from a human being to identify key performance indicators for each sub-process, wherein the key performance indicators are assumed to affect one or more sub-processes.

19. The computer program product of claim 18, wherein:
extracting a plurality of prediction models further comprises determining causal relationships between sub-processes to determine a prediction model as follows:
enumerating all possible causal relationships between sub-processes;
iterating through all possible subsets of the causal relationships and enlisting the predictors for each sub-process such that actual values of predictors belonging to a same sub-process are used, such that whenever there is an edge coming into a sub-process from a different sub-process, a predicted value of that sub-process's key performance indicator is used as a predictor, and such that a value of a final target key performance indicator corresponding to this subset of edges is predicted and a prediction error for the final target key performance indicator is noted; and
determining the final predication model further comprises setting the final prediction model as a subset of edges that corresponds to minimum prediction error for the corresponding key performance indicators.

20. The computer program product of claim 19, the program instructions executable by a computer system to cause the computer system to perform operations comprising: outputting information, by the computer system, to be used to display the final dependency graph for use by a human being, allowing the human being to make one or more modifications to the final dependency graph, and adjusting, by the computer system and responsive to any modifications made by the human being, the final dependency graph responsive to modification by the human being.

* * * * *